(12) United States Patent
Cremer

(10) Patent No.: US 6,456,634 B1
(45) Date of Patent: Sep. 24, 2002

(54) CIRCUIT AND METHOD FOR RECOGNIZING AN INTERRUPTION IN A LIGHT WAVEGUIDE LINK

(75) Inventor: Cornelius Cremer, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/624,696

(22) Filed: Jul. 24, 2000

(30) Foreign Application Priority Data

Jul. 22, 1999 (DE) .......................................... 199 34 498

(51) Int. Cl.[7] .............................. H01S 3/13; G02B 6/36
(52) U.S. Cl. .............................. 372/29.01; 372/29.012; 372/29.014; 385/88; 359/143; 356/73.1
(58) Field of Search .................................. 372/6, 29.011, 372/29.014; 359/341, 110, 124, 143; 356/73.1; 385/24, 123, 88

(56) References Cited

U.S. PATENT DOCUMENTS 6,061,170 A  *  5/2000  Rice et al. .................. 359/341
6,188,712 B1 *  2/2001  Jiang et al. .................. 372/96

* cited by examiner

*Primary Examiner*—Brian Healy
*Assistant Examiner*—Kevin S Wood
(74) *Attorney, Agent, or Firm*—Bell, Boyd & Lloyd PLLC

(57) ABSTRACT

A circuit method for recognizing an interruption in a light waveguide link, wherein the amplified spontaneous emission output by an intensifying fiber is monitored for recognizing an interruption along a light waveguide link having an intensifying fiber and, given failure of the amplified spontaneous emission to arrive, the transmission unit supplying the light signals into the light waveguide link is shut off.

7 Claims, 1 Drawing Sheet

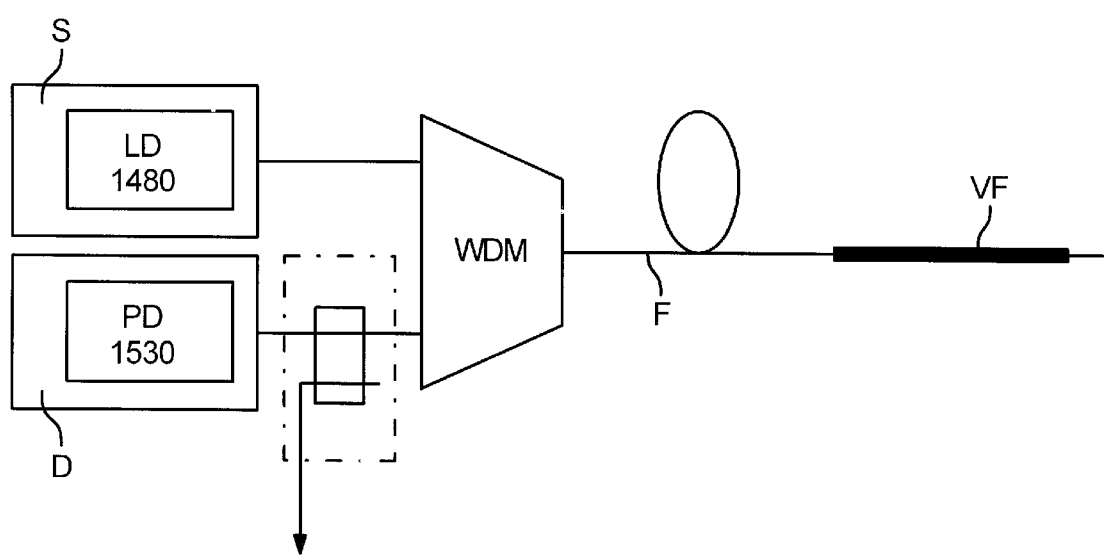

CIRCUIT AND METHOD FOR RECOGNIZING AN INTERRUPTION IN A LIGHT WAVEGUIDE LINK

BACKGROUND OF THE INVENTION

1. Field of the Invention

The present invention relates to a circuit and method for recognizing an interruption in a light waveguide link between a transmission unit and at least one intensifying fiber wherein an amplified spontaneous emission generated by the fiber is detected.

2. Description of the Prior Art

In optical fiber transmission systems having great distances between a pump laser and a fiber which intensifies the light of the pump laser, the pump laser must emit extremely high luminous power so that the intensifying fiber still receives enough light for intensification. In case of an interruption which is caused, for example, by a break or a separation of the light waveguide link, laser light having high luminous power can emerge from a fiber that lead to health hazards for a person.

In order to avoid health hazards, a light waveguide link or a separate monitoring channel was hitherto additionally established along a light waveguide link so as to monitor a closed condition of the transmission path. These monitoring devices, however, are accompanied by the disadvantage that the circuit-oriented outlay for regeneration and evaluation of the light signals is very high given very long link lengths of a light waveguide connection.

An object of the present invention, therefore, is to specify a circuit arrangement and an appertaining method for monitoring a light waveguide connection.

SUMMARY OF THE INVENTION

Accordingly, the present invention provides both a method and circuit for recognizing an interruption of a light waveguide link between a transmission unit and at least one intensifying fiber wherein an amplified spontaneous emission generated by the fiber is detected.

The present invention yields the advantage that no separate monitoring channel need be established along a light waveguide link.

The invention yields the further advantage that arbitrarily long light waveguide links can be monitored with a minimal circuit-oriented outlay.

Another advantage of the present invention is that only the first transmission section of a light waveguide link need be monitored.

Yet another advantage of the present invention is that a fast shut-off of the optical transmitter ensues.

The present invention yields the further advantage that the monitoring unit is not dependent on devices such as, for example, receiver units, return transmission units or control units.

Moreover, the present invention yields the advantage that, given outage of a light waveguide, only the pump laser that supplies light into this light waveguide need be shut off. A transmission unit of a intact optical light waveguide connection in, for example, the opposite transmission direction remains in operation.

Additional features and advantages of the present invention are described in, and will be apparent from, the following Detailed Description of the Preferred Embodiments and the Drawings.

DESCRIPTION OF THE DRAWINGS

The single figure shows the arrangement of the present invention for monitoring a light waveguide connection.

DETAILED DESCRIPTION OF THE PREFERRED EMBODIMENTS

For clarity, only the critical elements of an optical transmission unit S, a sensor unit D and a switching network WDM are shown in the figure.

A pump laser LD is arranged in the optical transmission unit S. This transmission unit S is followed by a coupler WDM to whose output a fiber F with an intensifying fiber VF is connected. The pump light of the pump laser has a first wavelength $\lambda 1$ of, for example, 1480 nm.

The pump light of the pump laser LD is coupled into a fiber path F to be monitored via the coupler WDM. At some distance from the coupler WDM, for example 100 km, an intensifying fiber VF is utilized for intensification of the pump light. Due to the absorption of the received pump light, the intensifying fiber VF is excited to a spontaneous emission, referred to below as amplified spontaneous emission ASE. The amplified spontaneous emission ASE propagates, among other things, into the fiber in the direction of the transmission unit and is forwarded via the WDM coupler to a photodiode PD of the sensor unit D. The crosstalk attenuation of the WDM coupler is thereby selected of such a size that the back-scattered or reflected pump light of the first wavelength $\lambda 1$ does not proceed to the photodiode. If the crosstalk attenuation of the WDM coupler is inadequate, then a further attenuation element can be arranged between the WDM coupler and the detector unit D.

The arrangement for recognizing an interruption between the pump laser LD and an intensifying fiber VF integrated in the course of a fiber of a light waveguide connection is based on the recognition of an amplified spontaneous emission ASE that emanates from the intensifying fiber VF. The pump light of the pump laser LD with the first wavelength $\lambda 1$ causes the amplified spontaneous emission ASE with a second wavelength $\lambda 2$ in the light-intensifying fiber VF. This second wavelength $\lambda 2$ given an erbium fiber can, for example, lie between 1530–1560 mn.

When the photodiode PD detects the wavelength spectrum of the second wavelength $\lambda 2$, then it is assured that the optical connection F between the pump laser LD and the intensifying fiber VF has no interruption. If a fiber break were to occur along the light waveguide connection between pump laser LD and the intensifying fiber VT, then the photodiode PD working as a detector can no longer receive the light having the wavelength $\lambda 2$. The pump light of the pump laser PD, which is hazardous to health, is then immediately shut off in a manner which need not be explicitly shown here.

No pump light hazardous to health can emerge from the light waveguide following the intensifying fiber VF since the pump light of the pump laser LD was absorbed by the intensifying fiber VF.

Although the present invention has been described with reference to specific embodiments, those of skill in the art will recognize that changes may be made thereto without departing from the spirit and scope of the invention as set forth in the hereafter appended claims.

I claim as my invention:

1. An optical fiber transmission system comprising:
a transmission unit which emits pump light;
an intensifying optical fiber;

an optical fiber link having an input in optical communication with said transmission unit and an output in optical communication with said intensifying optical fiber for supplying said pump light from said transmission unit to said intensifying optical fiber, said intensifying optical fiber, as a result of said pump light, emitting amplified spontaneous emission, some of said amplified spontaneous emission being back-scattered through said optical fiber link; and a circuit in optical communication with said input of said optical fiber link for detecting an interruption of said optical fiber link, said circuit detecting said back-scattered amplified spontaneous emission from said intensifying optical fiber and generating a signal indicating said interruption given an absence of said back-scattered amplified stimulated emission, said circuit being connected to said transmission unit and shutting off said transmission unit upon detecting said interruption in said optical fiber link.

2. An optical fiber transmission system as claimed in claim 1 wherein said intensifying optical fiber is an erbium fiber.

3. An optical fiber transmission system as claimed in claim 1 wherein said circuit comprises a photodiode for detecting said back-scattered amplified spontaneous emission.

4. An optical fiber transmission system as claimed in claim 1 further comprising a coupler optically connecting each of said transmission unit and said circuit to said input of said optical fiber link, said coupler separating said back-scattered amplified spontaneous emission from said pump light.

5. An optical fiber transmission system as claimed in claim 4 wherein said transmission unit emits said pump light at a first wavelength, and wherein said intensifying optical fiber emits said amplified spontaneous emission at a second wavelength, different from said first wavelength, and wherein said coupler separates said back-scattered amplified spontaneous emission and said pump light dependent on said first and second wavelengths.

6. A method for recognizing an interruption in a light waveguide link comprising the steps of:

emitting pump light from a transmission unit into an input of an optical fiber link;

communicating said pump light via said optical fiber link to an intensifying optical fiber;

using said pump light, generating amplified spontaneous emission in said intensifying optical fiber, some of said amplified spontaneous emission being back-scattered through said optical fiber link;

detecting said back-scattered amplified spontaneous emission at said input of said optical fiber link and identifying an interruption in said optical fiber link given an absence of back-scattered amplified spontaneous emission; and shutting off said transmission unit upon detection of said interruption in said optical fiber link.

7. A method as claimed in claim 6 comprising emitting said pump light at a first wavelength and generating said amplified spontaneous emission at a second wavelength, different from said first wavelength, and distinguishing said pump light from said back-scattered amplified spontaneous emission at said input of said optical fiber link dependent on said first and second wavelengths.

* * * * *